(12) United States Patent
Taira et al.

(10) Patent No.: US 8,335,529 B2
(45) Date of Patent: *Dec. 18, 2012

(54) WIRELESS COMMUNICATION METHOD

(75) Inventors: Masanori Taira, Yokohama (JP);
Kenzaburo Fujishima, Niiza (JP); Koki Uwano, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/041,816

(22) Filed: Mar. 7, 2011

(65) Prior Publication Data

US 2011/0151912 A1  Jun. 23, 2011

Related U.S. Application Data

(63) Continuation of application No. 12/611,966, filed on Nov. 4, 2009, now abandoned, which is a continuation of application No. 11/677,134, filed on Feb. 21, 2007, now Pat. No. 7,627,298.

(30) Foreign Application Priority Data

Mar. 23, 2006 (JP) ................................ 2006-080897

(51) Int. Cl.
*H04B 7/216* (2006.01)
*H04B 7/212* (2006.01)
*H04B 15/00* (2006.01)
*H04B 1/00* (2006.01)
*H04B 17/00* (2006.01)

(52) U.S. Cl. ..... 455/501; 370/320; 370/321; 455/226.3; 455/63.1; 455/67.13

(58) Field of Classification Search .......... 370/320–321; 455/501, 63.1, 67.13, 226.3
See application file for complete search history.

(56) References Cited

U.S. PATENT DOCUMENTS 6,804,521 B2 * 10/2004 Tong et al. .................... 455/450
(Continued)

FOREIGN PATENT DOCUMENTS

JP    10-155181    6/1998
(Continued)

OTHER PUBLICATIONS

The Third Generation Partnership Project 2 (3GPP2) Specification, [online], C. 50024-v4.0 cdma2000 High Rate Packet Data Air Interface Specification, [retrieval on Feb. 13, 2006], Internet <URL:http://www/3gpp2.org/Public_html/specs/tsgc.cfm>.

*Primary Examiner* — Marisol Figueroa
*Assistant Examiner* — Dung Hong
(74) *Attorney, Agent, or Firm* — Antonelli, Terry, Stout & Kraus, LLP.

(57) ABSTRACT

A wireless communication method in which a base station and a wireless terminal communicate, including: an operation at which a first and a second base station transmit, for each beam area, a pilot signal including identification information to identify the base station and the beam area, in a beam pattern; an operation at which the wireless terminal obtains received power of each pilot signal; an operation at which the wireless terminal causes one of the beam areas of the first base station to be a desired wave beam area, and determines two data rates for requiring to the base station: one of the data rates being a first data rate used in a case that interference from the second base station is relatively high and another of the data rates being a second data rate used in a case that the interference from the second base station is relatively low.

14 Claims, 6 Drawing Sheets

U.S. PATENT DOCUMENTS

| | | | |
|---|---|---|---|
| 7,627,298 B2 * | 12/2009 | Taira et al. | 455/226.1 |
| 2002/0068590 A1 * | 6/2002 | Suzuki et al. | 455/466 |
| 2002/0119781 A1 * | 8/2002 | Li et al. | 455/450 |
| 2004/0047425 A1 * | 3/2004 | Itoh | 375/259 |
| 2004/0196800 A1 * | 10/2004 | Padovani et al. | 370/321 |
| 2004/0235472 A1 * | 11/2004 | Fujishima et al. | 455/434 |
| 2005/0018614 A1 * | 1/2005 | Kiran | 370/252 |
| 2006/0223442 A1 * | 10/2006 | Stephens | 455/67.11 |

FOREIGN PATENT DOCUMENTS

| | | |
|---|---|---|
| JP | 2003-304577 | 10/2003 |
| JP | 2003-338803 | 11/2003 |
| JP | 2005-143148 | 6/2005 |

* cited by examiner

WIRELESS COMMUNICATION METHOD

CROSS-REFERENCE TO RELATED APPLICATION

This application is a continuation application of U.S. patent application Ser. No. 12/611,966, filed Nov. 4, 2009, now abandoned, which is a continuation application of U.S. patent application Ser. No. 11/677,134 (now U.S. Pat. No. 7,627,298), filed Feb. 21, 2007. This application relates to and claims priority from Japanese Patent Application No. 2006-080897, filed on Mar. 23, 2006. The entirety of the contents and subject matter of all of the above is incorporated herein by reference.

BACKGROUND OF THE INVENTION

The present invention relates to a wireless communication method, and particularly to a wireless communication method in which in a wireless system to perform cellular communication, an array antenna type wireless apparatus including a plurality of antennas is used, beams are formed in time division and packet transmission is performed.

Antennas used in cellular system base stations are directional antennas to form sectors, and in some antennas, an array antenna to further subdivide the sector is not added. The respective base stations use the same frequency channel and the mutual communication causes interference. The base stations transmit pilot signals in, for example, a nondirectional pattern, and a wireless terminal receives these signals and measures the respective signal levels. In the wireless terminal, a C/I (ratio of carrier wave power to interference wave power) can be calculated from the measured signal levels. The wireless terminal calculates a transmission data rate of the forward-link from the calculated C/I. The calculated transmission data rate is transmitted to the nearest base station via wireless. Based on this information, the base station specifies the data rate selected by the wireless terminal among a plurality of prepared modulators, and modulates user information sent from a network. The modulated signal is transmitted as a wireless signal from the antenna of the base station using the same radiation pattern (for example, nondirectional pattern) as the pilot signal.

As an example of the cellular system, a system of cdma2000 1x evolution-data only (1xEV-DO) will be considered. The detailed specifications for this system are obtained in, for example, non-patent document 1. In this system, a pilot channel and a data channel transmitted from a base station are multiplexed in time-division. A wireless terminal sequentially calculates a transmission data rate of a forward-link from the C/I of the time-division multiplexed pilot signal, and sequentially requests the data rate value from the base station. On the other hand, radiation pattern formation by an array antenna, and a forward-link data rate determination method in the system using that are not described in the form of specifications in the non-patent document 1 and other documents as well.

In the cdma2000 1xEV-DO system, there is disclosed a system of determining a forward-link data rate in a base station system using an array antenna (see, for example, patent document 1). In the disclosed system, for example, a sector is divided in narrow beam patterns using the array antenna, an interference power is measured from pilot signals transmitted in the plurality of beam patterns to estimate a C/I, and the forward-link data rate is obtained. Incidentally, the application of patent document 2 is a divisional application of the patent document 1 and discloses the same technique.

Besides, there is disclosed a system in which in fixed wireless, Signal Interference Ratio (SIR) information is shared between base stations to avoid interference (see, for example, patent document 3). In the disclosed method, for example, at the time of start of communication, or by a periodic operation, the interference is estimated at the reception side of each communication machine (base station and terminal). Alternatively, the signal ratio of signal to total interference signal is estimated. A database including data indicating the mutual interferences is installed, and each communication machine stores the interference information into the database. The interference in the relevant time slot is determined by accessing the database from the base station, a slot with a sufficiently low interference is selected and communication is performed. In the case where an intense interference is estimated in all slots, an assignment is not made to a slot.

Besides, another method is disclosed in patent document 4. In the disclosed system, a plurality of base stations uses array antennas, and transmits narrow beam pattern pilot signals. A wireless terminal receives the pilot signals transmitted from the respective base stations, estimates transmission paths of those, and transmits them as transmission path information to the base stations. The base station uses the transmission path information received from the wireless terminal and scheduling information shared with peripheral base stations to estimate forward-link signal quality, and determines a forward-link transmission rate to the wireless terminal. The forward-link transmission rate is used, and a data packet is transmitted in the narrow beam pattern directed to the wireless terminal.

[Patent document 1] JP-A-2003-338803
[Patent document 2] JP-A-2005-143148
[Patent document 3] JP-A-10-155181
[Patent document 4] JP-A-2003-304577
[Non-patent document 1] The Third Generation Partnership Project 2 (3GPP2) Specifications, [online], C. 50024-v4.0 cdma2000 High Rate Packet Data Air Interface Specification, [retrieval on Feb. 13, 2006],

SUMMARY OF THE INVENTION

In cdma2000 1xEV-DO, since the pilot signal and the user data signal are transmitted in the same fixed antenna pattern, at the wireless terminal side, the transmission path at the time of user data transmission is estimated from the pilot signal, one forward-link data rate suitable for the estimated transmission path is selected, and the value is requested from the base station side so that communication at the suitable forward-link data rate can be performed. However, in the base station including the array antenna, since the user data signal is transmitted in the individual antenna pattern directed toward the wireless terminal, for a wireless terminal positioned at a cell boundary, the interference of adjacent cells occurs or does not occur for the respective slots. Thus, the signal quality of the user data much varies according to the presence/absence of the interference. However, the forward-link data rate requested by the wireless terminal is one value estimated from the common pilot signal and is a value independent of the presence/absence of the interference, in the case where the interference from the adjacent cell occurs, there occurs a possibility that the signal of the slot can not be received.

For example, the base station always transmits the pilot signal to the wireless terminal as an omnipattern (nondirectional pattern) and estimates the transmission path. On the other hand, the base station switches the user data signal by an array antenna in the direction of the wireless terminal, with directionality of, for example, a sector pattern or a beam pattern for each slot and transmits it. Thus, there is a case where the amount of interference from an adjacent cell is different between a case where the pilot signal is transmitted and a case where the user data signal is transmitted. In the related art, with respect to a slot in which interference occurs, it is difficult to accurately predict the reception quality at the time when the data signal is received based on the reception quality of the pilot signal. Thus, there is a case where a packet loss occurs in a slot in which interference occurs, and accordingly, the throughput is reduced.

As stated above, in the variable rate communication system in which the beam is switched in time division by the array antenna, the reception quality is much changed at the cell boundary for each slot by the presence/absence of the occurrence of interference of the adjacent cell. However, since the forward-link communication rate requested from the terminal is a single value independent of the presence/absence of the interference, there is a case where the communication can not be performed at the rate corresponding to the change in the reception quality of each slot. Thus, a suitable throughput can not be obtained.

In a system of a first embodiment disclosed in the patent document 1, the adjacent base stations perform time-space packet scheduling in cooperation with each other, so that interference of the adjacent cells is decreased in the wireless terminal. On the premise of that, the wireless terminal adopts a method in which based on the highest pilot signal level of a base station to be connected and the lowest pilot signal level of an interfering base station, that is, a C/I in a case where the interference from the adjacent cell is lowest is estimated, and the forward-link data rate is selected based on the value. However, in this system, following problems occur according to the distribution of the wireless terminals.

First, in the case where all wireless terminals (or a plurality of wireless terminals, for example, terminals A) under a base station of an adjacent cell are distributed in the direction of a wireless terminal B connected to a desired base station, the beam patterns of the user data signals radiated from the base station of the adjacent cell are directed in the direction of the wireless terminal B in all slots (or many slots). Thus, since the desired base station determines that the wireless terminal B always has a large interference, a slot is not assigned. Accordingly, the wireless terminal B can not communicate at all, and there is a case where the throughput is reduced.

Further, in the case where all wireless terminals (for example, terminals C) under a desired base station are distributed in the direction of one wireless terminal D under a base station of an adjacent cell, in a slot in which the base station of the adjacent cell transmits user data while the directionality is directed to the wireless terminal D, it is determined that the interference is large for all the wireless terminals C under the desired base station, and accordingly, the slot is not assigned to all the wireless terminals C, and the wasteful empty slot occurs. Accordingly, the cell throughput is reduced. Incidentally, the above two problems become similar problems also in the case where the system disclosed in the patent document 3 is applied to mobile communication.

Besides, a system of a second embodiment disclosed in the patent document 1 is a system in which the cooperation between the base stations of the first embodiment is not performed, and is a system in which an estimation method of a C/I at a wireless terminal side is changed. The C/I is estimated using a value obtained by averaging interference powers of a case where the interference received from an adjacent cell is large and a case where it is small, and a forward-link transmission rate is selected. Thus, in a slot assigned to the wireless terminal, in the case where the interference is small, there is a possibility that transmission is performed at a low rate although the reception quality is excellent, while in the case where the interference is large, since the reception quality is degraded, there is a possibility that a packet loss occurs. Accordingly, the throughput of the wireless terminal is reduced.

In the system disclosed in the patent document 4, beam scheduling information indicating that beams are directed in which direction is shared between the base stations. At the wireless terminal side, the amount of interference from the respective beam patterns radiated by the adjacent cell is estimated, and all the amounts of interference are reported to the base station. Based on the information, a scheduler of the base station estimates the presence/absence of the interference and forward-link reception quality in that case, and the forward-link transmission rate is determined at the base station side, so that the data rate corresponding to the presence/absence of interference is selected. However, there are following problems.

First, with respect to the amount of interference of the adjacent cell reported from the wireless terminal side, since it is unknown which beam causes the interference in a slot to send forward-link data, all interference information is reported. Thus, the amount of reverse-link feedback information is large, and there is a possibility that the reverse-link data circuit capacity is reduced. Further, since the forward-link data rate is selected at the base station side, the wireless terminal side is required to have a plurality of demodulation circuits so that demodulation of all transmission rates can be performed, and there is case where the circuit scale becomes large.

In light of the circumstances described above, an object of the present invention is to provide a method in which under application of an inter-base-station cooperative system, to avoid the reduction of the throughput as a result of avoidance of the interference and, also in the slot in which the interference occurs, to enable communication at a suitable forward-link transmission rate. Besides, an object of the present invention is to provide a wireless communication method in which under the application of the inter-base-station cooperative system, the amount of reverse-link feedback information is decreased, and the scale of the demodulation circuit of the wireless terminal can be made small.

According to an aspect of the invention, a wireless communication system includes, for example, at least one wireless terminal and at least one base station apparatus, and includes step 1 at which the base station apparatus multiplexes individual pilot signals by using directional patterns for respective beam areas and transmits them, step 2 at which in the wireless terminal, individual pilot signals for respective beam areas of a desired base station are received, a beam area of the highest received power is made a desired wave beam area, and is requested as a desired beam area from the base station, step 3 at which in the wireless terminal, individual pilot signals of respective beam areas of an adjacent sector of the same base station and individual pilot signals of respective beam areas of a base station of an adjacent cell are received, and a first forward-link data rate (DRC1) is selected based on an S/I (power ratio of desired signal to interference signal) when, in a case where the beam area of the highest received power is made an interference component, the individual pilot signal of the desired wave beam area is S and the interference component is I, step 4 at which in the wireless terminal, the individual pilot signals of the respective beam areas of the adjacent sector of the same base station and the individual pilot signals of the respective beam areas of the base station of the adjacent cell are received, and a second forward-link data rate (DRC2) is selected based on an S/I (power ratio of desired signal to interference signal) when, in a case where the beam area of the lowest received power is made an interference component, the individual pilot signal of the desired wave beam area is S and the interference component is I, step 5 at which the two selected forward-link data rates (DRC1, DRC2) are requested as request rates from the base station, step 6 at which a scheduler of another sector and a scheduler of the base station of the adjacent cell share beam scheduling information indicating that mutual transmission is performed in which beam pattern, and the base station adjusts a beam schedule not to cause interference at a plurality of the wireless terminals, step 7 at which in a case where there is no beam schedule in which interference does not occur due to a specific arrangement of the wireless terminals in spite of the adjustment, user data is scheduled to the wireless terminal in which the interference occurs in order to avoid a reduction in throughput of the wireless terminal having a possibility that the interference occurs, step 8 at which in a case where scheduling to cause interference is performed in the base station, a first forward-link data rate request value (DRC1) requested by the wireless terminal is selected on the premise that the interference occurs, and in a case where scheduling not to cause interference is performed, a second forward-link data rate request value (DRC2) requested by the wireless terminal is selected on the premise that the interference does not occur, step 9 at which forward-link data is modulated and transmitted from the base station in accordance with the selected DRC value, and step 10 at which in the wireless terminal, demodulation is performed by two demodulation circuits so that the demodulation can be performed even if either of the two values of the forward-link data rate values (DRC1, DRC2) is requested.

According to the first solving means of this invention, there is provided a wireless communication method in which a base station and a wireless terminal communicate with each other, including:

a step at which a first and a second base station each including a plurality of beam areas transmit, for each beam area, a pilot signal including identification information to identify the base station and the beam area in a beam pattern;

a step at which the wireless terminal receives the pilot signals for each beam area from the first and the second base station and obtains received power of each pilot signal;

a step at which the wireless terminal causes one of the beam areas of the first base station to be a desired wave beam area;

a step at which the wireless terminal determines a first data rate based on the received power of a first interference beam area where the received power of the pilot signal from the second base station is highest or where the received power is a previously determined second threshold or higher and, the received power of the pilot signal of the desired wave beam area;

a step at which the wireless terminal determines a second data rate based on the received power of a second interference beam area which is one of beam areas where the received power of the pilot signal from the second base station is lower than the received power of the pilot signal of the first interference beam area and, the received power of the pilot signal of the desired wave beam area;

a step at which the wireless terminal transmits the determined first and second data rates and the identification information of the first interference beam area to the first base station;

a step at which the first base station assigns a slot to the wireless terminal;

a step at which the first base station refers to beam scheduling information including identification information of a beam pattern to be used in each slot by the second base station, selects, in a case where the identification information of the beam area to be used by the second base station in the slot assigned at the assigning step is coincident with the identification information of the first interference beam area received from the wireless terminal, the first data rate received from the wireless terminal, and selects, in a case where the identification information of the beam area to be used by the second base station is not coincident with the identification information of the first interference beam area, the second data rate received from the wireless terminal;

a step at which the first base station modulates data in accordance with one of the selected first data rate and second data rate, and transmits modulated data to the wireless terminal; and a step at which the wireless terminal decodes the data received from the first base station using the first and/or second data rate.

According to the invention, under application of an inter-base-station cooperative system, as a result of avoidance of the interference, the reduction of the throughput is avoided, and also in the slot in which the interference occurs, communication at a suitable forward-link transmission rate is enabled. Besides, a wireless communication method and a wireless communication system can be provided in which under the application of the inter-base-station cooperative system, the amount of reverse-link feedback information is decreased, and the scale of the demodulation circuit of the wireless terminal can be made small.

According to the invention, even if a variation in the interference state of each slot occurs, the communication can be performed while using the suitable data rate.

Thus, the reduction of the throughput due to this can be prevented.

DESCRIPTION OF THE PREFERRED EMBODIMENTS OF THE INVENTION

Hereinafter, an embodiment will be described, however, the invention is not limited to this.

Figure 1:
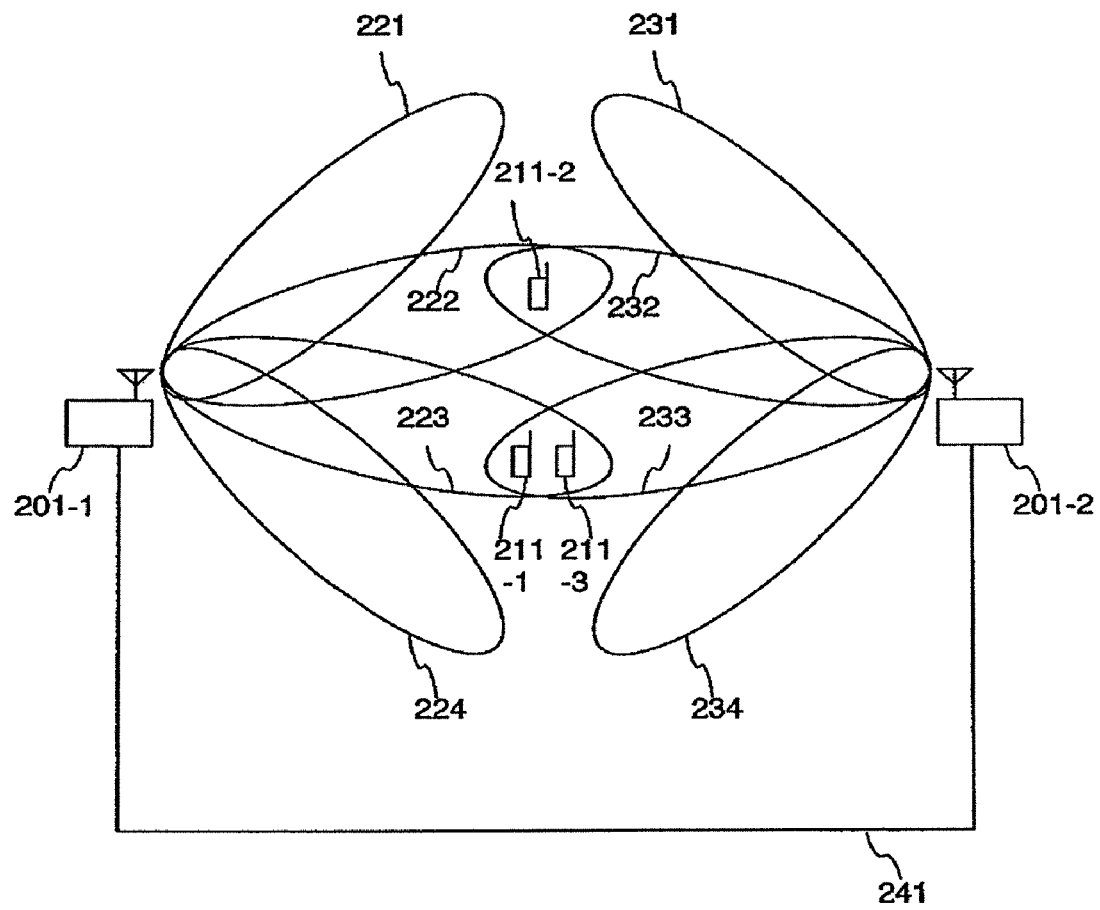
FIG. 1 is a system structural view of this embodiment.

FIG. 1 is a structural view of a wireless communication system of the embodiment.

The wireless communication system includes, for example, two base stations (201-1, 201-2) and a plurality of wireless terminals (211-1, 211-2, 211-3). Incidentally, although the illustrated example includes the two base stations and the three wireless terminals, more (or less) plural ones may be provided respectively. In the case where there are three or more base stations, for example, the structure may be considered such that every two of the plurality of base stations are paired.

In FIG. 1, for example, it is assumed that the wireless terminals 211-1 and 211-2 are connected to the first base station 201-1 (hereinafter denoted by AP1), and the wireless terminal 211-3 is connected to the second base station 201-2 (hereinafter denoted by AP2). In these, for example, each wireless terminal 211 can be connected to a base station having the highest received power (or previously determined first threshold or more) in received powers of pilot signals received from the respective base stations 201.

The respective base stations 201 form a plurality of beam areas (221, 222, . . . 231, 232, . . . ), and when user data is transmitted to the wireless terminal 211 in time division, the user data is transmitted in a radiation beam pattern of a beam area suitable to the direction where the wireless terminal 211 exists. Incidentally, each base station 201 may include a plurality of sectors, and each sector may include a plurality of beam areas.

The respective base stations AP1 (201-1) and AP2 (201-2) share, via a network line (241), beam scheduling information used at a time when the user data is scheduled, that is, information (identification information) describing which radiation beam pattern is used in which slot. Incidentally, a database storing the beam scheduling information may exist in each base station 201, or a shared database may be arranged on the network and control may be performed by the database. In this embodiment, since a suitable method can be used as a database control method, a more detailed description will be omitted here.

The AP1 (201-1) forms, for example, the beam areas 221, 222, 223 and 224, and the AP2 (201-2) forms, for example, the beam areas 231, 232, 233 and 234. Incidentally, the beam areas can be formed so as to cover, for example, all directions of the surroundings of the base station in addition to the illustrated directions.

Besides, the wireless terminal 211-1 is positioned in the range of the beam area 3 (223) of the AP1 (201-1) and receives the interference of the beam 3 (233) of the AP2 (201-2) and the like. The wireless terminal 211-2 is positioned in the range of the beam area 2 (222) of the AP1 (201-1) and receives the interference of the beam 2 (232) of the AP2 (201-2) and the like. The wireless terminal 211-3 is positioned in the range of the beam area 3 (233) of the AP2 (201-2) and receives the interference of the beam 3 (223) of the AP1 (201-1) and the like.

Figure 2:
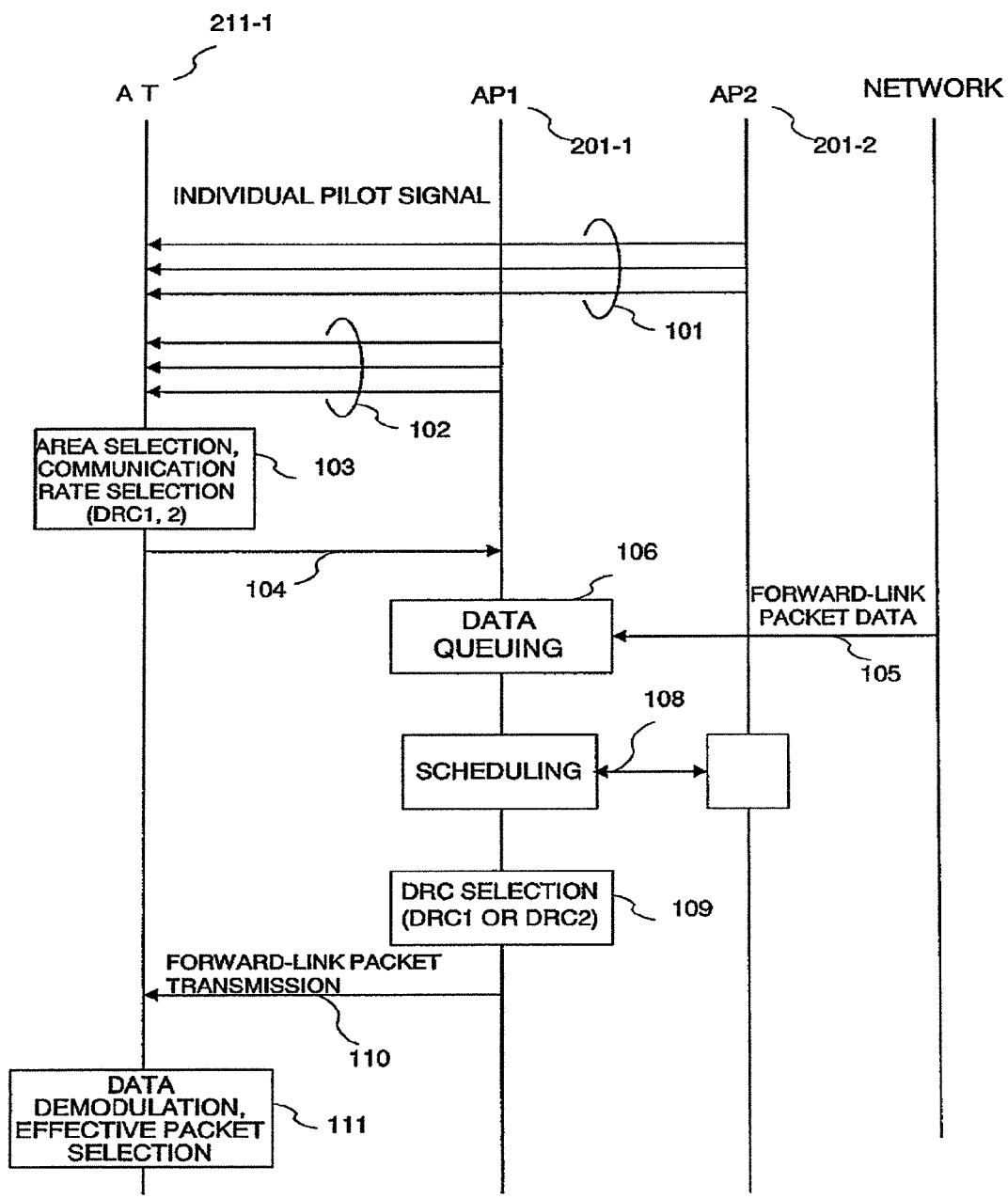
FIG. 2 is a flow view of the embodiment.

FIG. 2 is a sequence view of this embodiment.

The figure shows the passage of time from above to below. In the figure and the following description, attention is paid to the AP1 (201-1), the AP2 (201-2), and the wireless terminal 211-1 (hereinafter denoted by AT1), and the description will be made. However, the effects of this embodiment do not depend on the number of base stations. Besides, also with respect to the wireless terminals 211-2 and 211-3, the base stations to be connected or the beam areas are merely different from those of the AT1, and the sequence is the same.

Each of the base stations (AP1, AP2) transmits a unique individual pilot signal for each beam area (process 101, process 102). For example, the individual pilot signal includes identification information (for example, Walsh orthogonal code) to identify the base station and the beam area.

The AT1 (211-1) selects the area and obtains a communication rate (process 103). For example, the AT1 (211-1) measures reception levels of the pilot signals sent from the AP1 (201-1) to which itself is connected, and recognizes a beam area having the highest reception level among them as its own beam area (desired wave beam area). In the case of the AT1 (211-1) of FIG. 1, the beam area 3 (223) is the relevant one. Next, reception levels of the individual pilot signals sent from the AP2 (201-2) adjacent to the AP1 (201-1) are measured. Here, a beam having the highest reception level in the beams from the adjacent AP2 is made a first interference beam. In the case of the AT1 (211-1) of FIG. 1, the beam area 3 (233) of the adjacent base station AP2 (201-2) is the relevant one. Incidentally, the AT1 (211-1) may adopt a beam area having the highest received power in the received pilot signals as the desired wave beam area without paying attention to the base station (201-1) to which itself is connected. Besides, without paying attention to the adjacent base station, a beam area having the highest received power or a previously determined threshold or higher in beam areas except the beam areas of the base station (201-1) of the desired wave beam area may be made the first interference beam area.

Here, in a general wireless communication technique of the related art in which beam formation is not performed, since the interference power is single power outputted by an adjacent base station, when desired wave power is C and interference wave power is I, DRC is estimated from C/I. Besides, in the wireless communication technique of the related art in the case where beam formation is applied, the interference wave power is made the lowest power, that is, in the example of the AT1 (211-1), the power of a beam other than the beam area 3 (233) of the AP2 (201-2) is made the interference wave power to estimate C/I, and DRC is estimated. Alternatively, all powers of all beams of the AP2 (201-2) are reported to the connected base station AP1 (201-1).

This embodiment is different from these systems. In this embodiment, two C/I are estimated for the case where there is interference of the beam area (first interference beam area) having the largest influence and for the case where the interference is less than that or the case where there is no influence, two DRCs are obtained, and a request is made to the base station. That is, DRC1 is obtained from C/I assuming that the beam area 3 (233) of the AP2 exists. Further, DRC2 is obtained from C/I assuming that the beam area 3 (233) of the AP2 does not exist. For example, DRC2 is obtained from C/I of the case where there is interference from a beam area (second interference beam area) other than the first interference beam area.

For example, with respect to the AT1 (211-1), a beam area which is except the beam areas of the base station of the desired wave beam area and in which the received power of the individual pilot signal is largest next to the received power of the individual pilot signal of the first interference beam area is made the second interference beam area. Incidentally, with respect to the AT1 (211-1), a beam area which is except the beam areas of the base station of the desired wave beam area and in which the received power of the individual pilot signal is lowest within the range of not lower than a previously determined third threshold or one of the relevant beam areas may be made the second interference beam area. Besides, with respect to the AT1 (211-1), a beam area which is one of the beam areas of the base station of the first interference beam area and in which the received power of the individual pilot signal is minimum in a plurality of beam areas (for example, the beam areas 232 to 234 of FIG. 1) within a specified angle from the first interference beam area (for example, the beam area 233 of FIG. 1) may be made the second interference beam area.

The AT1 (211-1) reports the information (own area selection number) indicating that the AT1 is placed under the beam area 3 of the base station AP1 to which itself is connected and the information (interference area number) indicating that the beam area 3 (233) of the AP2 is the interference power having large influence, and requests the two DRC values (DRC1, DRC2) from the desired base station AP1 (201-1) (process 104).

On the other hand, when receiving forward-link packet data to the AT1 (211-1) from the network (process 105), the AP1 (201-1) once queues the data (process 106). Next, the scheduling information is shared with the adjacent base station, and scheduling suitable to the AT is performed (process 108). Specifically, the AP1 (201-1) knows from the report from the AT1 (211-1) at the process 104 that the AT1 (211-1) is placed under the beam area 3 (223), and the beam area 3 (233) of the adjacent AP2 (201-2) causes the interference. Accordingly, for example, the AP2 (201-2) first searches a slot which does not perform scheduling to the beam area 3 (233).

Here, in the wireless communication technique of the related art in which the beam scheduling information is shared between the base stations, since a slot in which interference does not occur is selected, under the condition that all slots cause interferences, assignment to the AT is not performed. However, this embodiment is different from such systems. In this embodiment, also under the condition that all slots cause the interferences, it is not excluded that scheduling is assigned to the AT. However, since the interference occurs, a packet loss occurs in the method as in the related art. However, in this embodiment, DRC1 assuming that there is interference is applied, so that it is possible to avoid the packet loss.

That is, the desired base station AP1 (201-1) shares the scheduling information with the adjacent base station AP2 (201-2) (process 108), DRC1 is selected in the slot sending the beam 3 (233) in which the AT1 (211-1) receives the interference, while DRC2 is selected in the case where the beam 3 (233) is not sent (process 109). The AP1 (201-1) modulates the packet data using the selected rate and transmits the packet to the AT1 (211-1) (process 110). The AT1 (211-1) demodulates and decodes the received data by both the DRC1 and DRC2, and uses (outputs) the data packet in which the decoding has been successful (process 111). It can be determined by CRC (Cyclic Redundancy Check) whether or not the decoding has been successful. For example, the determining is performed by a flag indicating whether or not decoding has been normally performed.

By this, in the case where the interference occurs, remarkable reduction of the scheduling rate is avoided, and a suitable rate is selected, so that it becomes possible to obtain a suitable throughput in which a packet loss does not occur.

Figure 3:
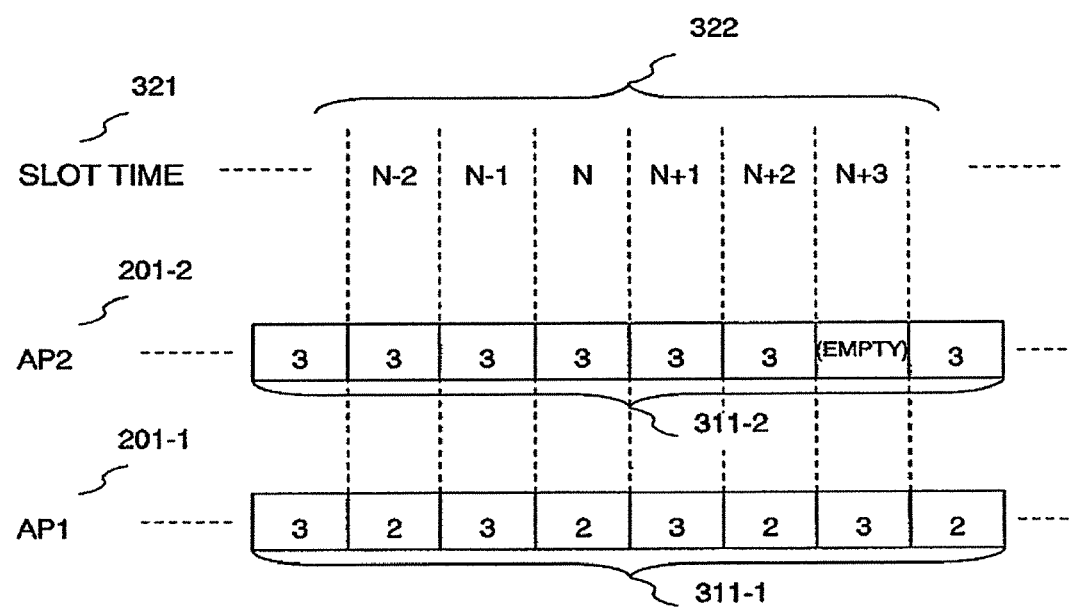
FIG. 3 is an image view of scheduling information sharing of the embodiment.

FIG. 3 is a view showing an image of beam scheduling information shared by the adjacent base stations. That is, in the process 108 in the sequence view of FIG. 2, the image of the information shared by the adjacent base stations is shown in the figure. The figure shows the passage of time from left to right. A slot time (321) is a slot number (322) incremented by +1 for each slot from left to right. For example, in CDMA2000 1xEV-DO, in the standards of the non-patent document 1, 00:00:00 of Jan. 6, 1980 is made slot 0, and a cumulative slot time is made a CDMA system time. Alternatively, this may be made a previously regulated slot number, for example, a relative slot number in a round including 600 slots. In any case, the time unit is made such that synchronization is possible between adjacent base stations. The shared beam scheduling information is such that a beam area assigned by each base station is stored in each slot.

In the example of FIG. 3, beam scheduling information (311-1) for each slot assigned by the AP1 (201-1) indicates such an example that from time (N−2) to (N+2), the beam area 2 (222) is scheduled every second slot, and from time (N−1) to (N+3), the beam area 3 (223) is scheduled every second slot. Besides, beam scheduling information (311-2) for each slot assigned by the AP2 (201-2) indicates that from time (N−2) to (N+2), the beam area 3 (233) is scheduled, and at time (N+3), an empty slot occurs.

Here, a slot at (N+1) will be considered. In the slot at (N+1), for example, in the AP2 (201-2), the beam area 3 (233) is scheduled. Because, in the example of FIG. 1, a wireless terminal connected to the AP2 (201-2) is only the AT3 (211-3) under the beam area 3 (233). On the other hand, in the AP1 (201-1), one of the beam area 2 (222) where the AT2 (211-2) is positioned and the beam area 3 (223) where AT1 (211-1) is positioned can be selected. Under this condition, in the wireless communication technique of the related art in which the schedule information is shared and scheduling of the wireless terminals is performed, the AT2 (211-2) is selected without fail. Because, when the AT1 (211-1) is selected, the beam 3 (223) of the AP1 (201-1) and the beam 3 (233) of the AP2 (201-2) interfere with each other. However, if so doing, assignment to the AT1 (211-1) does not occur permanently, and there is a problem that the throughput is remarkably reduced.

However, this embodiment is different. In this embodiment, the AT1 (211-1) may be assigned also in the slot at (N+1) in which interference occurs. Because, two transmission rates, that is, the forward-link transmission rate DRC1 assuming that the interference exists (or large) and the forward-link transmission rate DRC2 assuming that there is no interference (or small) are requested from the AT1 (211-1). The AP1 (201-1) selects the DRC1 in the slot at (N+1) where interference occurs and selects the DRC2 in a slot such as the one at (N+3) where interference does not occur. By this, also under the interference, a remarkable reduction in throughput is avoided, and communication at a suitable forward-link transmission rate becomes possible.

Figure 4:
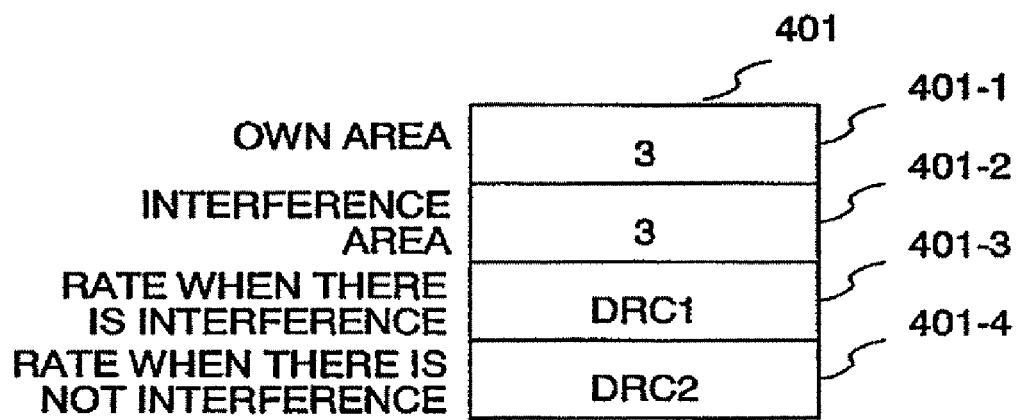
FIG. 4 is a view of wireless terminal feedback information elements of the embodiment.

FIG. 4 is a view showing elements of feedback information which the wireless terminal 211 reports to and requests from the base station 201 in this embodiment. That is, at the process 104 in the sequence view of FIG. 2, the information is transmitted by the wireless terminal 211 to the base station 201. The information includes, for example, four elements. That is, an area number (401-1) of the base station to which itself is connected, an interference area number (401-2) of an adjacent base station, a forward-link transmission rate request value (401-3) assuming that there is interference, and a forward-link transmission rate request value (401-4) assuming that there is no interference. Incidentally, in addition to the area number, suitable identification information to identify an area or a beam may be used. In the example shown in FIG. 1 in which the AT1 (211-1) reports to the AP1 (201-1), the area number (401-1) of the base station to which itself is connected is the beam area 3 (223), the interference area number (401-2) of the adjacent base station is the beam area 3 (233), the forward-link transmission rate request value (401-3) assuming that there is interference is the DRC1, and the forward-link transmission rate request value (401-4) assuming that there is no interference is the DRC2.

Here, in the wireless communication technique of the related art in which the schedule information is shared and the scheduling of the wireless terminal is performed, the number of the forward-link transmission rate request values is only one, or all beam received power values of the adjacent base station are transmitted instead of the request rate value. As compared with the system of the related art in which the number of the forward-link transmission rate request values is only one, in this embodiment, two rate request values are adopted, so that the amount of feedback is increased. However, the request rate value has generally several bits and pressure is not put on the reverse-link. Besides, in the different system of the related art in which all beam received power values of the adjacent base station are transmitted, each of the power values has 32 bits in floating point, or 16 bits or 8 bits in fixed point, and the amount of data is obtained by multiplying this by the number of beam areas, and therefore, pressure is put on the reverse-link. As compared with this, in this embodiment, only several bits of the forward-link transmission rate request value are merely increased, and there is a merit that pressure is not put on the reverse-link.

Figure 5:
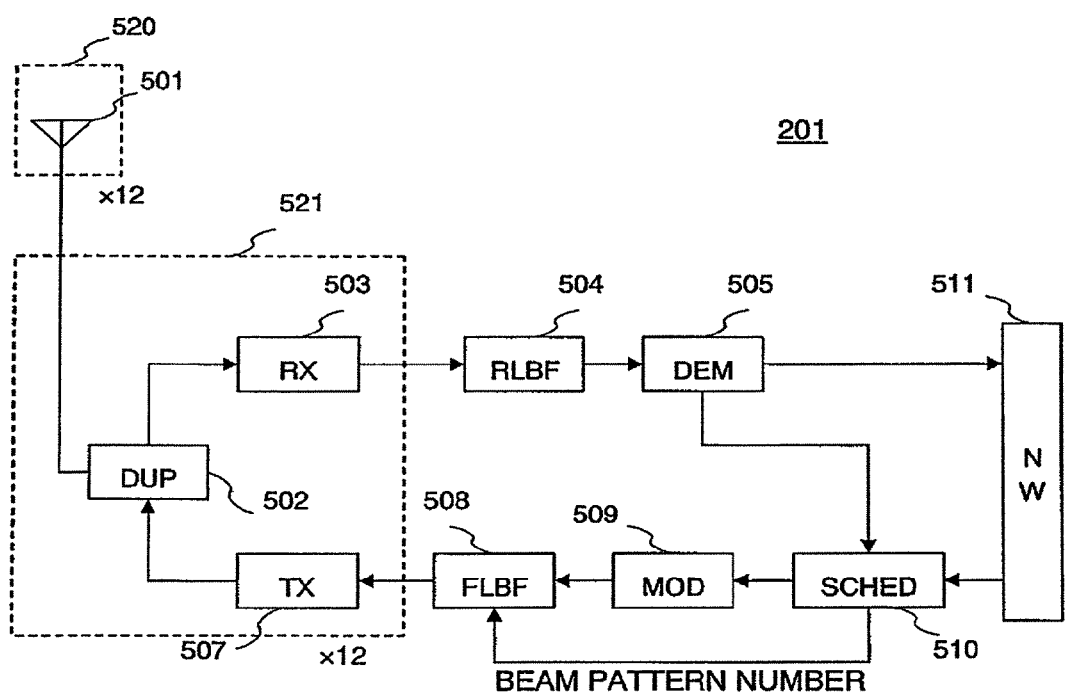
FIG. 5 is a structural view of a base station apparatus of the embodiment.

FIG. 5 is a structural view of the base station (201) of this embodiment. The base station 201 includes an array antenna 520, a radio-frequency (RF) unit 521, a reverse-link beam controller (RLBF) 504, a demodulator (DEM) 505, a forward-link beam controller (FLBF) 508, a modulator (MOD) 509, a scheduler (SCHED) 510, and a network interface (NW) 511. The array antenna 520 includes a plurality of antenna elements 501. The RF unit 521 includes a duplexer (DUP) 502, a reception RF circuit (RX) 503, and a transmission RF circuit (TX) 507.

First, a reverse-link circuit in the base station 201 will be described. A reverse-link signal from the wireless terminal 211 is received by an antenna element 501 in the antenna array 520, passes through the duplexer (DUP) 502 in the RF unit 521, and is input to the reception RF circuit (RX) 503. The duplexer (DUP) 502 separates a reverse-link reception signal and a forward-link transmission signal; it can be constructed, for example, of band selection filters that select the respective signals or it can be constructed of a circulator. After amplifying and frequency converting the signal from the antenna element 501 to obtain a predetermined sensitivity, the reception RF circuit (RX) 503 converts the signal to a digital signal using an A/D converter.

As described above, the array antenna 520 includes the plurality of antenna elements 501. For example, when a twelve-element array antenna is used, the array antenna 520 includes twelve antenna elements 501, and the RF unit 521 is also provided with twelve duplexers (DUP) 502, twelve reception RF circuits (RX) 503, and twelve transmission RF circuits (TX) 507, corresponding to the number of antenna elements. Therefore, reverse-link signals from the antenna elements 501 are input to the reverse-link beam controller (RLBF) 504 from the twelve reception RF circuits (RX) 503. Similarly, the forward-link beam controller (FLBF) 508 outputs forward-link signals to the twelve transmission RF circuits (TX) 507.

The reverse-link signals from the twelve reception RF circuits (RX) 503 are input to the reverse-link beam controller (RLBF) 504, which then generates individual reverse-link beam coefficients for the plurality of wireless terminals 211 and combines the twelve reverse-link signals in the form of a vector. By doing so, the reverse-link beam controller (RLBF) 504 receives signals in directions that are suitable for the respective wireless terminals 211. Alternatively, the reverse-link beam controller (RLBF) 504 combines the twelve reverse-link signals into an omnidirectional pattern for reception using the same beam coefficient for all the wireless terminals 211. The reverse-link beam controller (RLBF) 504 then outputs the reverse-link signal, combined using one of the methods described above, to the demodulator (DEM) 505.

A demodulator (DEM) (505) demodulates a reverse-link signal for each wireless terminal (211) by a reverse diffuser, a RAKE synthesizer, a decoder and the like incorporated therein. Further, the reverse-link data signal is sent to a network via a network interface unit (NW) (511). Besides, the demodulator (DEM) (505) outputs the own area selection number (401-1) included in the demodulated reverse-link signal, the interference area number (401-2), the two forward-link data rate request values DRC1 (401-3) and DRC2 (401-4), that is, one set of the wireless terminal feedback information (401) to a scheduler unit (SCHED) (510). The wireless terminal feedback information (401) input by the scheduler unit (SCHED) (510) is used for an after-mentioned forward-link scheduling operation. The above is the description concerning the reverse-link.

Next, the forward-link in the base station (201-1) will be described. The forward-link data signal input to the network interface unit (NW) (511) from the network is input to the scheduler unit (SCHED) (510).

The scheduler unit (SCHED) (510) performs a scheduling operation to transmit the forward-link data signal to the respective wireless terminals (211), and an example of the operation will next be described. The scheduler unit (SCHED) (510) calculates a scheduling evaluation value of each wireless terminal (211) based on the two forward-link data rate request values DRC1 (401-3) and DRC2 (401-4) in the wireless terminal feedback information (401) input from the demodulator (DEM) (505). For example, DRC2/R using a forward-link average rate R for each wireless terminal (211) and DRC2 (401-4) assuming that there is no (or small) maximum interference beam of an adjacent base station may be made an evaluation value, or in addition to these values, (DRC1+DRC2)/R using DRC1 (401-3) assuming that the maximum interference beam of the adjacent base station exists (or large) may be made an evaluation value. These methods are expansions of the proportional fairness system used in the related art. Scheduling is performed so that this evaluation value becomes uniform among the respective wireless terminals (211), and the own area selection number (401-1) of the wireless terminal (211) is made the radiation beam pattern at the time when the forward-link data signal is transmitted. Incidentally, the radiation beam pattern can be selected from, for example, the previously determined plurality of beam patterns as shown in FIG. 1. Information in which this radiation beam pattern is made to correspond to each slot and is controlled is made the beam scheduling information (311-1).

Next, the scheduler unit (SCHED) (510) shares the beam scheduling information (311-1, 311-2) with the adjacent base station (201-2) via the network line (241). Incidentally, this network line (241) may be a dedicated line having an object to share the beam scheduling information (311-1, 311-2), or may be shared with the network for communication of the reverse-link and forward-link data signals.

Further, the scheduler unit (SCHED) (510) refers to the interference area number (401-2) scheduled at the former step and received from the wireless terminal (211) among the interference area numbers (401-2) input from the demodulator (DEM) (505). Based on this interference area number (401-2) and the shared beam scheduling information (311-2) of the adjacent base station (201-2), it is determined whether or not the wireless terminal (211) receives interference from the adjacent base station (201-2) in the slot in which the scheduling is performed. For example, in the slot in which the scheduling is performed, in the case where the identification information of the beam area used by the adjacent base station (201-2) is coincident with the identification information of the first interference beam area received from the wireless terminal, it is determined that the interference is received (or the interference is large), while in the case where they are not coincident with each other, it is determined that the interference is not received (or the interference is small).

In the case where the wireless terminal (211) does not receive the interference in the slot, DRC2 (401-4) assuming that the wireless terminal (211) does not receive the maximum interference beam is determined to be the forward-link transmission rate. In the case where the wireless terminal (211) receives the interference in the slot, another slot not receiving the interference is searched, beam scheduling is newly performed again, and the beam scheduling information (311-1) of the own station is updated. Besides, with respect to an empty slot, the wireless terminal (211) in which the scheduling evaluation value is next highest is selected at the former step, and the beam scheduling information (311-1) is again updated.

Here, in the wireless communication technique of the related art in which the beam scheduling information is shared between the base stations, since an attempt is made to select the wireless terminal (211) in which the interference does not occur, under the condition in which all wireless terminals (211) cause the interference, data packet assignment is not made to any wireless terminals (211) in the slot. Alternatively, since the slot in which the interference for the wireless terminal (211) does not occur is selected, assignment to the wireless terminal (211) is not performed under the condition that all slots cause the interference. However, this embodiment is different from these systems. In this embodiment, in the case of the condition under which all slots cause the interference for the wireless terminal (211), or in the case of the condition under which all wireless terminals (211) cause the interference in the slot, the DRC1 (401-3) assuming that the wireless terminal (211) receives the maximum interference beam is determined to be the forward-link transmission rate. By this, in the case where the interference occurs, it is avoided that the scheduling rate is remarkably reduced, and further, by selecting the suitable rate, it becomes possible to obtain the suitable throughput in which a packet loss does not occur.

Next, the scheduler unit (SCHED) (510) outputs the beam pattern number corresponding to the determined radiation beam pattern to the forward-link beam controller (FLBF) (508). Incidentally, as the beam pattern number, not only the number but also suitable information to identify the beam or the direction of the beam, such as a character or an angle, can be used. Besides, the scheduler unit (SCHED) (510) outputs the determined forward-link transmission data rate and the forward-link data signal for the wireless terminal (211) input from the network interface unit (NW) (511) to the modulator (MOD) (509).

Incidentally, the modulator (MOD) (509) and the forward-link beam controller (FLBF) (508) transmit the individual pilot signal to each beam pattern independently of the forward-link data packet transmission. Besides, the forward-link beam controller (FLBF) (508) multiplies the individual pilot signal series by the Walsh orthogonal code in accordance with the radiation beam pattern number when the individual pilot signal is beam formed. This is performed to identify that the wireless terminal (211) is under which beam pattern. Incidentally, with respect to transmission of the individual pilot signal, in this embodiment, any transmission method may be used. For example, a method in which the rounds of the respective beam patterns are regularly made and they are transmitted, or a method in which they are simultaneously transmitted may be used.

The modulator (MOD) (509) uses the input forward-link transmission data rate, modulates the forward-link data signal by a coder, a diffuser and the like incorporated therein, time-division multiplexes individual pilot signals, MAC (Medium Access Control) signals and the like, and outputs them to the forward-link beam controller (FLBF) (508).

The forward-link beam controller (FLBF) (508) uses the radiation beam pattern number input from the scheduler unit (SCHED) (510) and beam-forms the forward-link data signal time-division multiplexed by the modulator (MOD) (509). Those signals beam-formed by the forward-link beam controller (FLBF) (508) become twelve forward-link signals, and are outputted to twelve transmission RF circuits (TX) (507). Each of the transmission RF circuits (TX) (507) converts the forward-link signal input from the forward-link beam controller (FLBF) (508) into an analog signal by a D/A converter, and then performs amplification, frequency conversion and the like. Besides, the transmission RF circuit (TX) (507) outputs the converted forward-link signal via a duplexer (DUP) (502) to antenna elements (501) constituting an array antenna (520), and the forward-link signal is radiated from the antenna elements (501). The above is the description concerning the forward-link.

Figure 6:
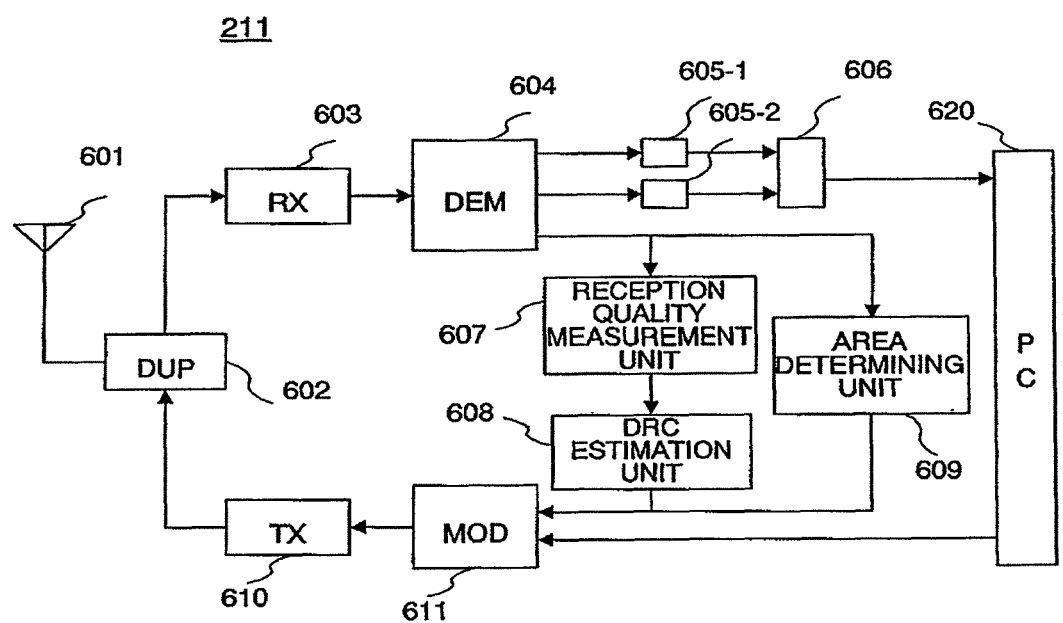
FIG. 6 is a structural view of a wireless terminal of the embodiment.

FIG. 6 is a structural view of the wireless terminal (211).

The wireless terminal (211) includes an antenna unit (601), a duplexer (DUP) (602), a reception RF circuit (RX) (603), a demodulator (DEM) (604), a data packet decoding unit (605), an effective data packet selection unit (606), a reception quality measurement unit (607), a DRC estimation unit (608), an area determining unit (609), a transmission RF circuit (TX) (610), a modulator (MOD) (611), and a PC interface unit (620).

First, the forward-link in the wireless terminal (211) will be described. The forward-link signal from the base station (201-1) is received by the antenna unit (601), passes through the duplexer (DUP) (602), and is input to the reception RF circuit (RX) (603). The reception RF circuit (RX) (603) causes the input signal to have a specified sensitivity by performing amplification, frequency conversion and the like, and then converts it into a digital signal by the ND converter, and outputs it to the demodulator (DEM) (604). The demodulator (DEM) (604) demodulates the forward-link signal by the reverse diffuser, the RAKE synthesizer and the like incorporated therein, and separates it into a time-division multiplexed forward-link data signal before decoding, an individual pilot signal, a MAC signal and the like. The forward-link data signal before decoding separated by the demodulator (DEM) (604) is output to the two data packet decoding units (605-1, 605-2). In the respective data packet decoding units (605-1, 605-2), decoding is performed at two forward-link request rates (DRC1, DRC2). The reason why the decoding is performed by the two data packet decoding units (605-1, 605-2) is that the wireless terminal (211) does not know that the base station (201-1) encodes the forward-link transmission data packet at which transmission rate till the relevant reception slot occurs. Incidentally, it is not always necessary to physically prepare the two data packet decoding units (605). For example, it can be replaced by performing the decoding at two forward-link request rates (DRC1, DRC2) in a short time.

The two data packet decoding units (605-1, 605-2) output forward-link data signals decoded at the two forward-link request rates (DRC1, DRC2) and flags indicating whether or not the decoding is normally performed to the effective data packet selection unit (606). Incidentally, whether or not the decoding is normally performed is determined by CRC (Cyclic Redundancy Check), that is, a method of cyclic redundancy check. Since this determining method is a general method, its description is omitted here. Incidentally, since encoding is performed in the base station (201-1) at one of the DRC1 and DRC2, the decoding can be normally performed in one of the two data packet decoding units (605-1, 605-2).

The effective data packet selection unit (606) selects the forward-link data signal which has been normally decoded, outputs the forward-link data signal to the PC interface unit (PC), and transmits it to the higher-level layer. Besides, the demodulator (DEM) (604) outputs the separated individual pilot signal to the area determining unit (609) and the reception quality measurement unit (607).

The area determining unit (609) determines an area where the wireless terminal exists in its own connected base station AP1 (201-1) based on the input individual pilot signal, specifically, the Walsh orthogonal code of the individual pilot signal transmitted by its own connected base station AP1 (201-1) and the received power level, and outputs it as the own area selection number (401-1) to the modulator (MOD) (611). Besides, the area determining unit (609) determines that the interference is received from which area of the adjacent base station AP2 (201-2) from the input individual pilot signal, specifically the Walsh orthogonal code of the individual pilot signal transmitted by the adjacent base station AP2 (201-2) and the received power level, and outputs it as the interference area number (401-2) to the modulator (MOD) (611).

Besides, the reception quality measurement unit (607) measures the respective reception qualities (for example, C/I) of the respective input individual pilot signals, specifically, the respective individual pilot signals transmitted from its own connected base station AP1 (201-1) and the adjacent base station AP2 (201-2). For example, C/I (first C/I) of a case where an I component (interference component) includes the individual pilot signal power of the beam area indicating the interference having the highest influence among interferences received from the adjacent base station AP2 (201-2) and C/I (second C/I) of a case where the I component does not include the individual pilot signal power of the beam area indicating the interference having the highest influence are measured, and are output to the DRC estimation unit (608).

Based on the two input reception qualities (first C/I, second C/I), the DRC estimation unit (608) estimates two data rate request values (DRC) most suitable for the forward-link at the time when the respective C/I values are supposed, and outputs them to the modulator (MOD) (611). That is, the DRC1 (401-3) assuming that interference is received (or large) and estimated from the first C/I, and DRC2 (401-4) assuming that interference is not received (or small) and estimated from the second C/I are outputted to the modulator (MOD) (611). Incidentally, the DRC estimation unit (608) may output the determined DRC1 and DRC2 to the data packet decoding unit (605-1, 605-2).

Next, the reverse-link in the wireless terminal 211 will be described. A reverse-link data signal from the higher-level layer is input to the modulator (MOD) 611 via the PC interface 620. The modulator (MOD) 611 code multiplexes the reverse-link data signal, two forward-link data rates DRC1 401-3, DRC2 401-4 output from the DRC estimation unit 608, the own area selection number 401-1 output from the area determining unit 609, and interference area number 401-2 and encodes, diffuses, and modulates them to generate a reverse-link signal. The reverse-link signal generated by the modulator (MOD) 611 is input to the transmission RF circuit (TX) 610, which then converts the signal to an analog signal using a D/A converter contained therein, followed by amplification, frequency conversion, and so forth. The converted signal passes through the duplexer (DUP) 602 and is radiated by the antenna unit 601.

The present invention can be applied to technologies including base stations performing cellular communication, array-antenna wireless devices provided with a plurality of antenna elements, base stations that generate beams to perform time-division packet transmission, and wireless communication systems.

What is claimed is:

1. A wireless communication method in which a base station and a wireless terminal communicate with each other, comprising:

an operation at which a first and a second base station each including a plurality of beam areas transmit, for each beam area, a pilot signal including identification information to identify the base station and the beam area, in a beam pattern;

an operation at which the wireless terminal receives the pilot signals for each beam area from the first and the second base station, and obtains received power of each pilot signal;

an operation at which the wireless terminal causes one of the beam areas of the first base station to be a desired wave beam area;

an operation at which the wireless terminal determines two data rates for requiring to the base station: one of the data rates being a first data rate used in a case that interference from the second base station is relatively high and another of the data rates being a second data rate used in a case that the interference from the second base station is relatively low; the first data rate being determined based on the received power of a first interference beam area where the received power of the pilot signal from the second base station is highest or where the received power is a previously determined second threshold or higher, and the received power of the pilot signal of the desired wave beam area and; the second data rate being determined based on the received power of a second interference beam area which is one of beam areas where the received power of the pilot signal from the second base station is lower than the received power of the pilot signal of the first interference beam area and, the received power of the pilot signal of the desired wave beam area;

an operation at which the wireless terminal transmits the determined first and second data rates to the first base station;

an operation at which the first base station assigns a slot to the wireless terminal;

an operation at which the first base station refers to beam scheduling information including identification information of a beam pattern to be used in each slot by the second base station, selects, in a case where the identification information of the beam area to be used by the second base station in the slot assigned at the assigning operation is coincident with the identification information of the first interference beam area received from the wireless terminal, the first data rate received from the wireless terminal, and selects, in a case where the identification information of the beam area to be used by the second base station is not coincident with the identification information of the first interference beam area, the second data rate received from the wireless terminal; and an operation at which the wireless terminal decodes the data received from the first base station using the first and second data rate.

2. The wireless communication method according to claim 1, wherein
the operation at which the wireless terminal determines two data rates include:
an operation at which the wireless terminal obtains a power ratio of desired signal to interference signal based on the received power of the pilot signal of the desired wave beam area and one of the received power of the first and the second interference beam area; and
an operation at which the wireless terminal determines the first or the second data rate according to the obtained power ratio of desired signal to interference signal.

3. The wireless communication method according to claim 1, wherein
the data received from the first base station includes a flag to confirm whether the data has been normally decoded,
wherein the operation at which the wireless terminal decodes the data includes:
an operation of decoding the data and the flag received from the first base station at both the first data rate and the second data rate; and
an operation of referring to the respective flags decoded at the first and the second data rates and outputting the data in which the flag is detected.

4. The wireless communication method according to claim 1, wherein
the second interference beam area is the beam area where, with respect to the pilot signal from the second base station, the received power of the pilot signal is larger compared to the received power of the pilot signal of the first interference beam area.

5. The wireless communication method according to claim 1, wherein
the second interference beam area is the beam area where the received power of the pilot signal from the second base station is minimum in a plurality of beam areas of the second base station each having the received power over a previously determined third threshold.

6. The wireless communication method according to claim 1, wherein
the second interference beam area is the beam area of the second base station, and is the beam area where the received power of the pilot signal from the second base station is minimum in a plurality of beam areas of the second base station each having a specified angle or less from the first interference beam area.

7. The wireless communication method according to claim 1, further comprising:
an operation at which the first base station modulates data in accordance with one of the first data rate and second data rate, and transmits modulated data to the wireless terminal.

8. A wireless communication method in which a base station and a wireless terminal communicate with each other, comprising:
an operation at which a first and a second base station each including a plurality of beam areas transmit, for each beam area, a pilot signal including identification information to identify the base station and the beam area, in a beam pattern;
an operation at which the wireless terminal receives the pilot signals for each beam area from the first and the second base station, and obtains received power of each pilot signal;
an operation at which the wireless terminal causes one of the beam areas of the first base station to be a desired wave beam area;
an operation at which the wireless terminal determines two data rates for requiring to the base station: one of the data rates being a first data rate being used in a case of interference, and another of the data rates being a second data rate used in a case of lower interference; the first data rate being determined based on the received power of a first interference beam area where the received power of the pilot signal from the second base station is highest or where the received power is a previously determined second threshold or higher, and the received power of the pilot signal of the desired wave beam area and; the second data rate being determined based on the received power of a second interference beam area which is one of beam areas where the received power of the pilot signal from the second base station is lower than the received power of the pilot signal of the first interference beam area and, the received power of the pilot signal of the desired wave beam area;
an operation at which the wireless terminal transmits the determined first and second data rates to the first base station;
an operation at which the first base station assigns a slot to the wireless terminal;
an operation at which the first base station refers to beam scheduling information including identification information of a beam pattern to be used in each slot by the second base station, selects, in a case where the identification information of the beam area to be used by the second base station in the slot assigned at the assigning operation is coincident with the identification information of the first interference beam area received from the wireless terminal, the first data rate received from the wireless terminal, and selects, in a case where the identification information of the beam area to be used by the second base station is not coincident with the identification information of the first interference beam area, the second data rate received from the wireless terminal; and
an operation at which the wireless terminal decodes the data received from the first base station using the first and second data rate.

9. The wireless communication method according to claim 8, wherein
the operation at which the wireless terminal determines two data rates include:
an operation at which the wireless terminal obtains a power ratio of desired signal to interference signal based on the received power of the pilot signal of the desired wave beam area and one of the received power of the first and the second interference beam area; and
an operation at which the wireless terminal determines the first or the second data rate according to the obtained power ratio of desired signal to interference signal.

10. The wireless communication method according to claim 8, wherein
the data received from the first base station includes a flag to confirm whether the data has been normally decoded,
wherein the operation at which the wireless terminal decodes the data includes:
an operation of decoding the data and the flag received from the first base station at both the first data rate and the second data rate; and
an operation of referring to the respective flags decoded at the first and the second data rates and outputting the data in which the flag is detected.

11. The wireless communication method according to claim 8, wherein the second interference beam area is the beam area where, with respect to the pilot signal from the second base station, the received power of the pilot signal is larger compared to the received power of the pilot signal of the first interference beam area.

12. The wireless communication method according to claim 8, wherein the second interference beam area is the beam area where the received power of the pilot signal from the second base station is minimum in a plurality of beam areas of the second base station each having the received power over a previously determined third threshold.

13. The wireless communication method according to claim 8, wherein the second interference beam area is the beam area of the second base station, and is the beam area where the received power of the pilot signal from the second base station is minimum in a plurality of beam areas of the second base station each having a specified angle or less from the first interference beam area.

14. The wireless communication method according to claim 8, further comprising:

an operation at which the first base station modulates data in accordance with one of the first data rate and second data rate, and transmits modulated data to the wireless terminal.

* * * * *